(12) United States Patent
Lefedjiev

(10) Patent No.: US 7,088,079 B2
(45) Date of Patent: Aug. 8, 2006

(54) ACTIVE POWER FACTOR CORRECTION

(75) Inventor: Adrian Lefedjiev, Renfrewshire (GB)

(73) Assignee: Minebea Co. Ltd. (JP)

( * ) Notice: Subject to any disclaimer, the term of this patent is extended or adjusted under 35 U.S.C. 154(b) by 80 days.

(21) Appl. No.: 10/344,777

(22) PCT Filed: Aug. 30, 2001

(86) PCT No.: PCT/GB01/03890

§ 371 (c)(1),
(2), (4) Date: Jul. 10, 2003

(87) PCT Pub. No.: WO02/21671

PCT Pub. Date: Mar. 14, 2002

(65) Prior Publication Data

US 2004/0100232 A1    May 27, 2004

(30) Foreign Application Priority Data

Sep. 5, 2000  (GB) .................................. 0021763.8
Sep. 11, 2000 (GB) .................................. 0022233.1

(51) Int. Cl.
G05F 1/70 (2006.01)

(52) U.S. Cl. .................... 323/222; 323/207; 363/89
(58) Field of Classification Search ............... 323/207, 323/265, 287, 349, 299, 284, 222; 363/39, 363/41, 40, 43, 89, 143, 24, 25, 133, 17, 363/98, 132

See application file for complete search history.

(56) References Cited

U.S. PATENT DOCUMENTS

| | | | | | |
|---|---|---|---|---|---|
| 5,404,093 | A | * | 4/1995 | Cowett, Jr. ............. | 323/207 |
| 5,406,192 | A | * | 4/1995 | Vinciarelli ............. | 323/222 |
| 5,912,549 | A | * | 6/1999 | Farrington et al. ..... | 323/207 |
| 6,256,209 | B1 | * | 7/2001 | Gurwicz et al. ........ | 363/17 |

* cited by examiner

Primary Examiner—Rajnikant B. Patel
(74) Attorney, Agent, or Firm—Ipsolon LLP

(57) ABSTRACT

An active power factor pre-converter having AC voltage input from a mains AC power supply and a DC output voltage, the pre-converter comprising adjustment means to adjust automatically, in operation, the DC output voltage as a function of the rectified AC voltage input.

10 Claims, 5 Drawing Sheets

ACTIVE POWER FACTOR CORRECTION

This invention relates to active power factor correction and more particularly to an active power factor corrector and method for active power factor correction where a DC output voltage from an AC mains voltage is required and it is desirable to control harmonic currents or the power factor.

Particularly in the field of personal computers but in many other applications, there is a requirement to convert the AC voltage from the mains source to a low DC voltage as required by circuitry within the personal computer. Switched mode power supplies (SMPS) are particularly well suited to this requirement. These are much more efficient than linear power supplies, typically around 70%–80% at full rated load, leading to smaller dissipative items. SMPS's offer better power densities than linear supplies, in terms of output watts per unit volume or weight.

A disadvantage of SMPS's with basic input circuitry is that they draw an innately non-sinusoidal current from the mains source. The resultant non-continuous current causes harmonics to be introduced into the power source, distorting the mains waveforms.

The electrical distortion generated on the mains by harmonics is additive. As more and more personal computers and other electrical equipment are introduced to the electricity distribution system, so the problem worsens. Increased harmonics levels lead to anomalies in the operation of sensitive equipment such as personal computers and other equipment powered by the SMPS's. Distortion fed into the mains source can be reduced in two basic ways: passive power factor correction (PFC) and active power factor correction (PFC).

This invention is concerned with active PFC and uses active control to shape the current drawn from the grid to the required sinusoid. An ideal active PFC circuit would draw a sinusoidal input current that is in phase with the mains supply voltage (i.e. a power factor of unity) while delivering the electrical energy in high voltage smooth DC form to the next stage of power conversion thereby reducing harmonic distortions.

A conventional active PFC circuit (otherwise known as an active power factor corrector, boost pre-converter or active power factor pre-converter) would aim to maintain a constant DC output voltage (or boost voltage) regardless of the mains RMS AC input voltage level. An example of such an active PFC circuit is shown in FIG. 1 of the accompanying drawings. The active PFC circuit includes a step-up or boost converter in place of just an inductor as would be used in a passive PFC circuit. The input to the boost converter is the mains RMS AC voltage. The voltage output from the step-up converter is a DC voltage which is higher than the input RMS AC voltage. Conventional active PFC circuits produce a fixed DC output voltage which is higher than the maximum amplitude of the input AC voltage—typically 380V to 400V. In the illustrated example, the fixed DC output voltage is 385V. The fixed output voltage is maintained by a feedback loop which taps a sample of the DC output voltage and compares this in a voltage error amplifier located internally of a PFC IC with a fixed reference voltage. A block diagram of the PFC IC used in the active PFC circuit of FIG. 1 is shown in FIG. 2 of the accompanying drawings.

In a typical low voltage power supply a PFC circuit is followed by a step-down DC-DC converter to produce a low (5V, 12V, 3.3V etc.) DC output for components and circuitry within the load, for example a personal computer. The basic arrangement is shown schematically in FIG. 3 of the accompanying drawings. FIG. 3 shows an AC mains power supply 1 connected to a bridge rectifier 2. The rectified output of the rectifier 2 is fed through an active power factor pre-converter 3 to provide a DC output voltage which is fed to a main power supply converter 4, typically a step-down converter. The output of the main power supply converter would be used to supply the connection load 5, typically components of a personal computer.

The efficiency of such a conventional active power factor corrector operating at the lower end of the input mains voltage range (80 Vrms or 113V pk) is compromised because a relatively low input voltage, for example 80 Vrms, is stepped-up to an unnecessarily high level, for example 400V, which is then used by the main step-down DC-DC converter to produce a low DC output, for example 3.3V, 5V, 12V.

It is an object of the present invention to seek to provide an apparatus and method of active power factor correction which improves upon and which is more efficient than conventional active power factor correction solutions.

Accordingly, one aspect of the present invention provides an active power factor pre-converter having a rectified AC voltage input from a mains AC power supply and a DC output voltage, the pre-converter comprising adjustment means to adjust automatically, in operation, the DC output voltage as a function of the rectified AC voltage input.

Preferably, the means to adjust the DC output voltage includes means to sample the rectified AC voltage input and the DC output voltage.

Advantageously, the adjustment means adjusts the DC output voltage to a lower threshold value if the rectified AC voltage input falls below a predetermined value.

Conveniently, the adjustment means adjusts the DC output voltage to an upper threshold if the rectified AC voltage input rises above a predetermined value.

Preferably, the adjustment means adjusts the DC output voltage to track the rectified AC voltage input.

Advantageously, the adjustment means adjusts the DC output voltage to a level a fixed amount greater than the rectified AC voltage input.

Conveniently, the fixed amount is between 0 and 15% of the amplitude of the rectified mains voltage.

Preferably, the active power factor pre-converter is connected to a main power supply converter.

Advantageously, the main power supply converter produces synchronisation pulses and the active power factor pre-converter is disabled when synchronisation pulses from the main power supply converter cease.

Conveniently, an auxiliary converter is still operable to take power from the mains AC power supply when the active power factor pre-converter is disabled.

A further aspect of the present invention provides a method of active power factor correction comprising the step of automatically adjusting a DC output voltage of an active power factor pre-converter as a function of a rectified AC voltage input to the pre-converter.

In order that the present invention may be more readily understood, embodiments thereof will now be described, by way of example, with reference to the accompanying drawings, in which.

Figure 1:
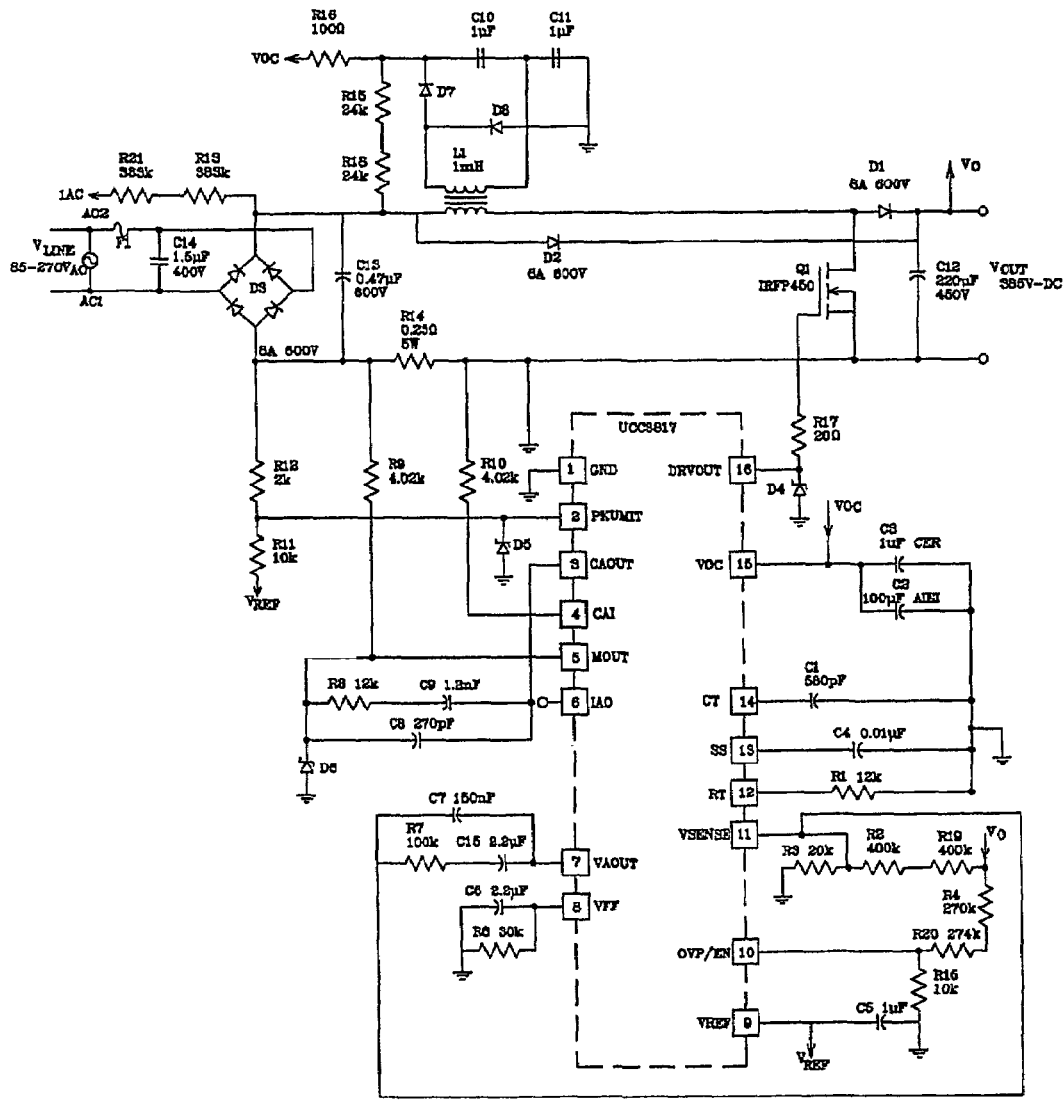
FIG. 1 is a circuit diagram of an AC mains power supply connected to a bridge rectifier and a conventional power factor pre-converter.
Figure 3:
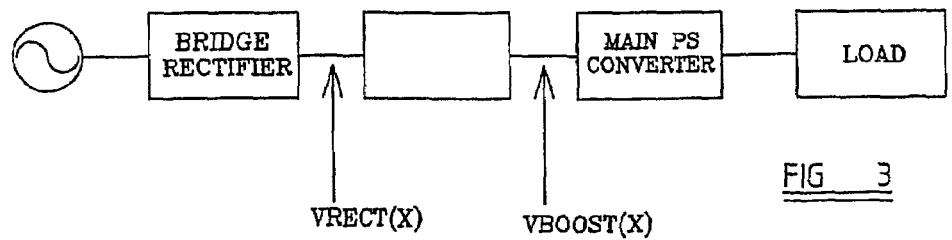
FIG. 3 is a schematic diagram of a power supply having active power factor correction.
Figure 2:
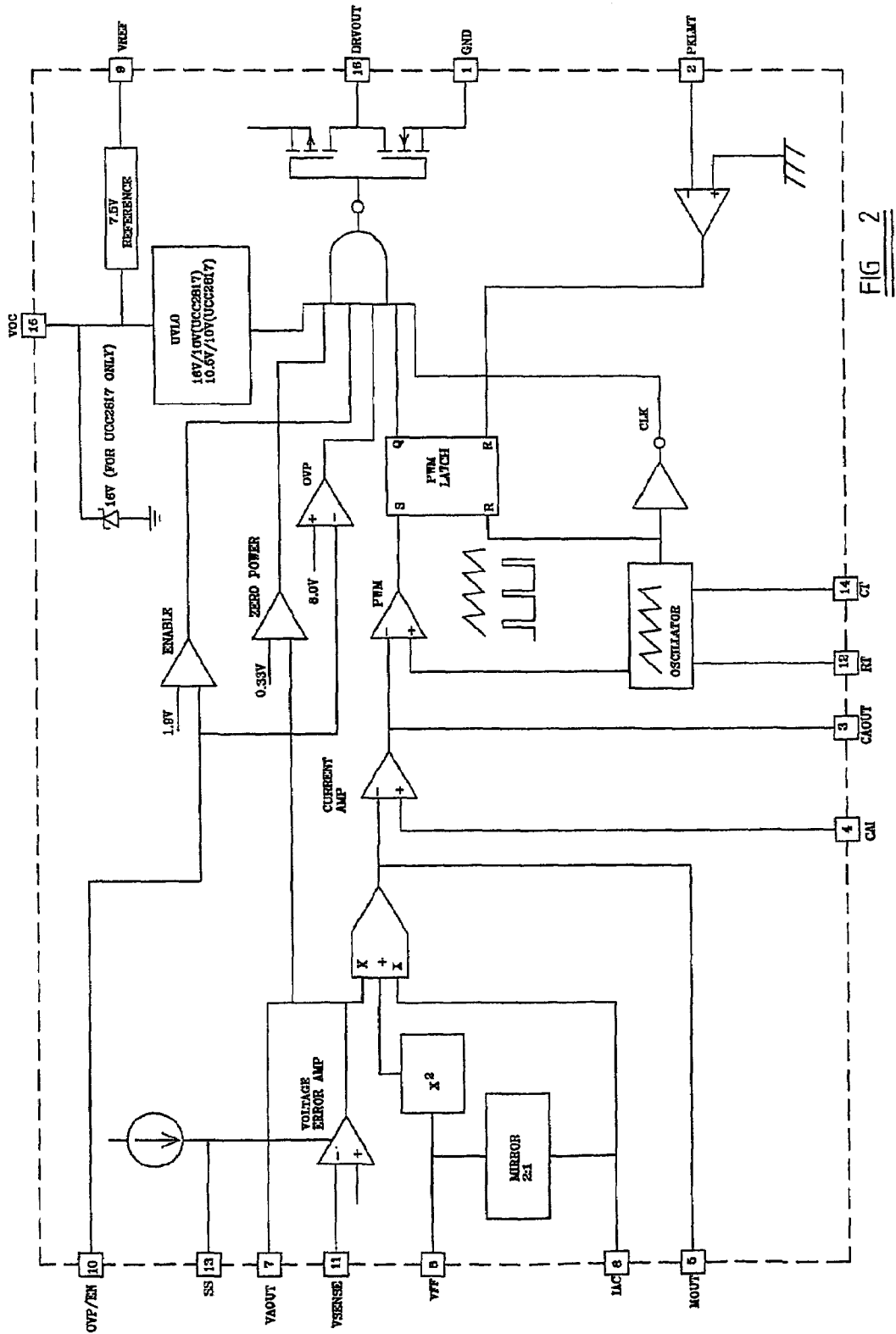
FIG. 2 is a circuit block diagram of a power factor correction control IC for use in the conventional power factor pre-converter.

Referring to FIGS. 1 and 2, these show a conventional active power factor pre-converter and its associated circuitry. The pre-converter is incorporated in a power supply for a load such as the components of a personal computer. FIG. 3 shows an AC mains power supply 1 connected to a bridge rectifier 2. The rectified output of the rectifier 2 is fed through an active power factor pre-converter 3 to provide a DC output voltage which is fed to a main power supply converter 4, typically a step-down converter. The output of the main power supply converter is used to supply the connected load 5, typically the components of a personal computer.

Figure 4:
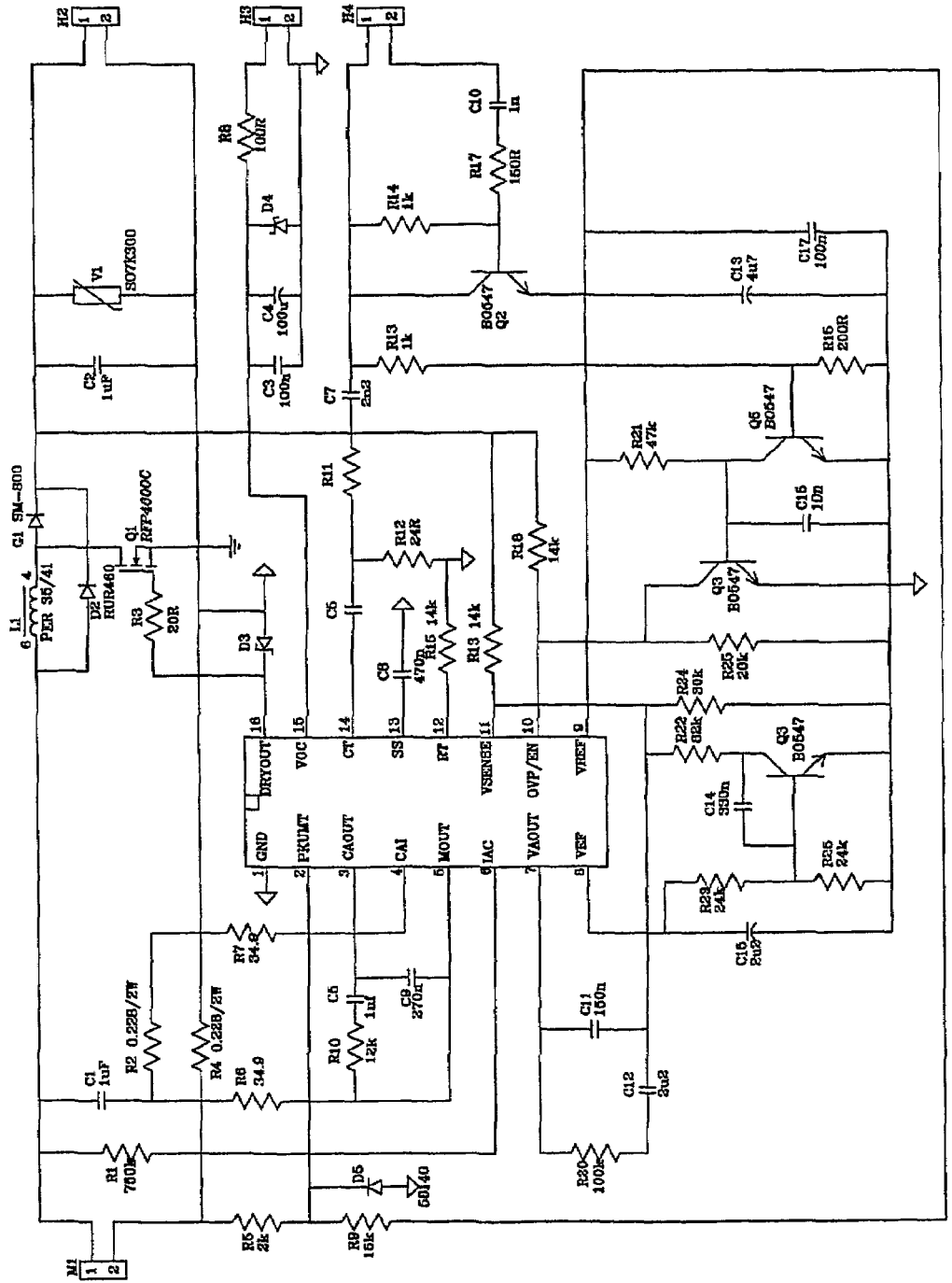
FIG. 4 is a circuit diagram of an active power factor pre-converter embodying the present invention.

An improved active power factor pre-converter embodying the present invention is shown in FIG. 4 and can be used as a direct replacement for a conventional active power factor pre-converter. Indeed, referring to FIG. 3, the active power factor pre-converter embodying the present invention is intended to act as the pre-converter 3. Thus, the active power factor pre-converter 3 embodying the present invention receives, at its input H1, a rectified AC mains supply voltage from the rectifier 2. The main component of the active power factor pre-converter 3 is a power factor correction (PFC) control IC 6, a readily available component which may be, for example, a Unitrode Products UCC81511, UCC2817, UCC2818, UCC3817 or UCC3818—the UCC3818 is illustrated in FIG. 4. It is not essential to the invention to implement the active power factor pre-converter using a PFC control IC although the use of a PFC control IC is most convenient. Discrete components may be used to replace the functionality of the PFC control IC.

The active power factor pre-converter 3 embodying the present invention takes the DC output of the bridge rectifier 2 and passes the DC output to the PFC control IC 6 and to the input of a conventional boost DC-DC converter 7. The output of the boost converter 7 is output H2 which feeds the main power supply converter 4. The DC output voltage of the boost converter 7 follows the peak of the unsmoothed rectifier output AC voltage within a range of rectifier input AC voltages. In a preferred embodiment, the DC output voltage remains a fixed amount above that peak, preferably 2% of the amplitude of the rectified mains voltage. A margin of between 0 to 15% is envisaged. This is in direct contrast to a conventional active power factor pre-converter 3 which specifically fixes the output DC voltage at a set level (385 VDC in the example of FIG. 1). The ability of the active power factor pre-converter 3 embodying the present invention to adjust automatically and profile the DC output voltage in relation to the unsmoothed rectified AC input voltage is crucial to the present invention.

A conventional active PFC circuit aims to draw a current signal from the AC mains input that has the same shape and phase as the voltage waveform. This is achieved by producing a reference signal that varies in proportion with the rectified, (but unsmoothed) mains voltage and then adjusting the duty cycle of the MOSFET (Q1) so that the input current level follows this reference signal. In the conventional active power factor pre-converter 3 the magnitude of this reference signal is adjusted to maintain a constant and fixed DC output voltage. The present invention aims to adjust automatically the DC output voltage according to the rectified AC voltage supplied by the mains whilst the active power factor pre-converter 3 is in operation in order to achieve higher efficiency.

PFC control ICs 6 typically incorporate an internal voltage error amplifier 7 (see FIG. 2). In a conventional active power factor pre-converter 3, the DC output voltage is maintained at a fixed level by a feedback loop which taps a sample (VSENSE) of the DC output voltage and compares this in the voltage error amplifier to a fixed reference voltage. The tracking function can be introduced to any PFC control IC6 by programming the reference of the internal voltage error amplifier 7 as a function of the input rms voltage. This method requires direct access to the error amplifier non-inverting input (see FIG. 2), which is not available with UCC3818 as well as with most other dedicated PFC control ICs. Alternatively an external voltage error amplifier can be used in addition to the PFC control IC. The output voltage tracking circuitry 8, in the example shown in FIG. 4, must therefore modify the inverting input of the voltage error amplifier to vary the output (DRVOUT) of the PFC control IC. DRVOUT is the feed to the boost converter circuitry 9. In a preferred embodiment, the DC output tracks the peak rectified input voltage remaining always above it by a small amount necessary for the proper operation of the boost converter. This avoids unnecessary boosting at the input thereby improving efficiency. The profiling of the DC output voltage can be regarded as a method of tracking the rectified AC input voltage. Tracking can be achieved in a number of different ways which will be appreciated by those skilled in the art. Three examples of output voltage tracking circuitry are set out below.

The output voltage tracking circuitry of the active power factor pre-converter 3 embodying the present invention shown in FIG. 4 implements the output voltage tracking function externally to the PFC control IC 6 by resistor R22, bipolar junction transistor Q4, Capacitor C14, resistor R26, resistor R23 and capacitor C15 in addition to the conventional external components associated with the PFC control IC6. These components define the algorithm or function which is used to adjust the DC output voltage as a function of the rectified AC voltage input.

Figure 6:
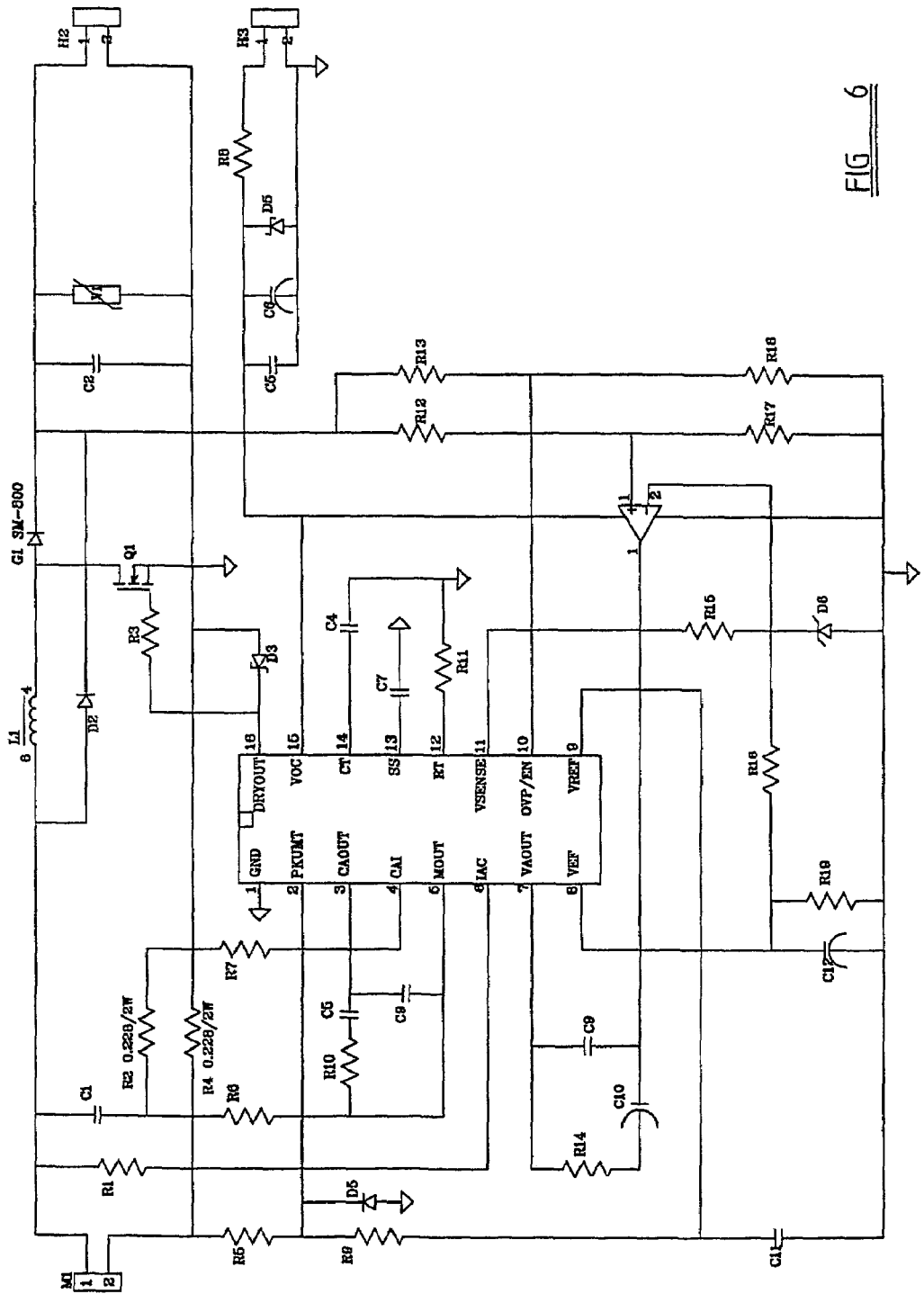
FIG. 6 is a circuit diagram of a further active power factor pre-converter embodying the present invention.

The active power factor pre-converter 3 circuit shown in FIG. 4 represents one possible way of implementing output voltage tracking. In this example of the active power factor pre-converter 3, the non-inverting input of the internal voltage error amplifier is effectively interrupted by the output voltage tracking circuit 8. It is also possible to implement output voltage tracking in a number of other ways. FIG. 6 shows another possible implementation using an external voltage error amplifier to achieve the same function. Another and possibly the easiest method of implementing output voltage tracking would be to obtain access to the non-inverting input of the internal voltage error amplifier and vary this input as a function of the rectified AC voltage input. This option would dispense with the need to accommodate the fixed reference voltage provided to the non-inverting input of the voltage error amplifier.

Figure 5:
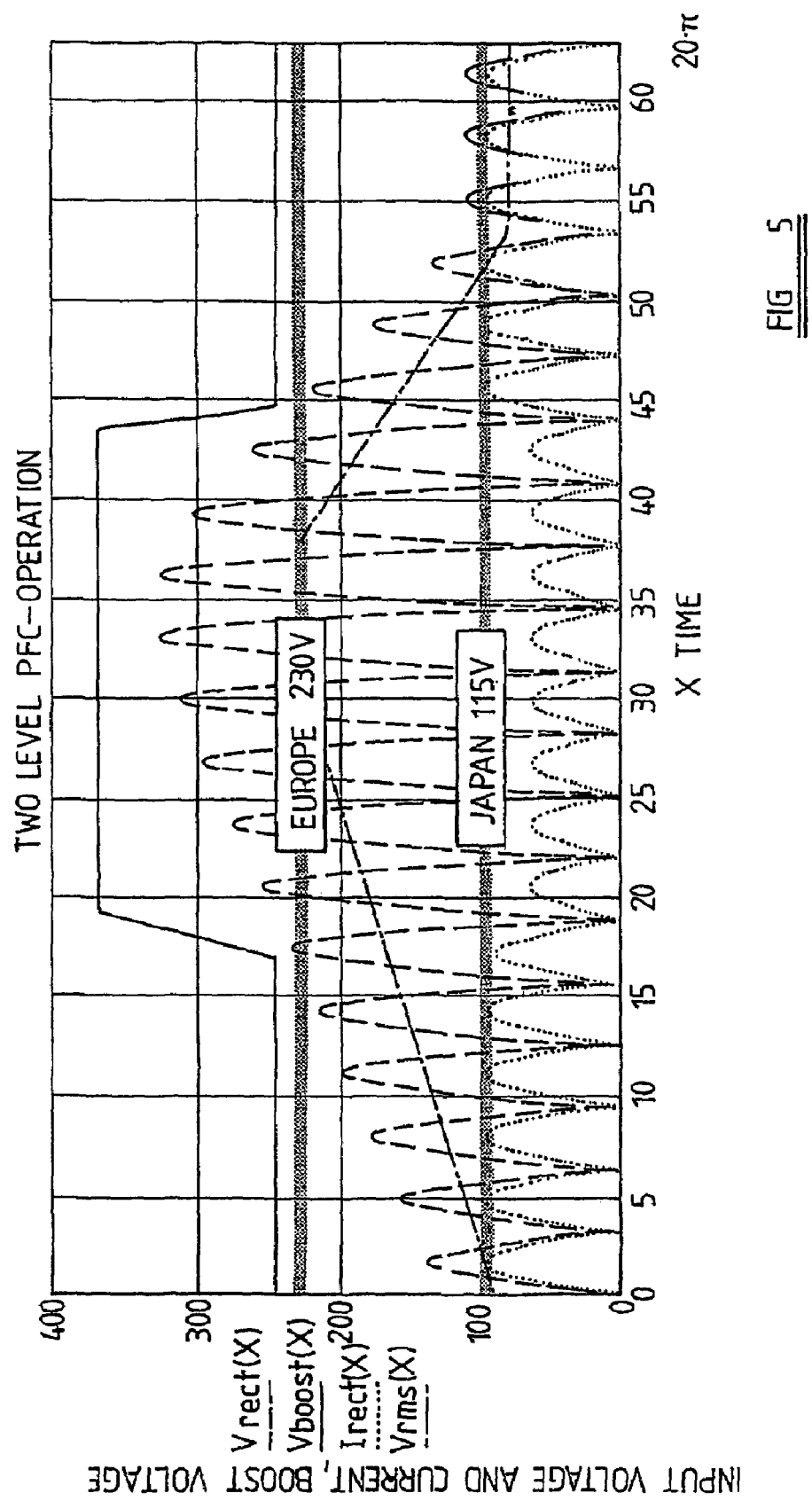
FIG. 5 is a graph showing input AC rectified voltage and current and DC output voltage for the active power factor pre-converter of FIG. 4.

In operation of the active power factor pre-converter 3 of FIG. 4, and as illustrated in FIG. 5, the DC output voltage on H2, Vboost(x), tracks the rectified input AC voltage, Vrect(x). The internally generated voltage VFF (pin 8) of the PFC control IC6 is a DC level representative of the rectified input AC voltage Vrect(x). Potential divider R23, R26 delivers a sample of VFF to the base of bipolar junction transistor Q4. The circuit is calibrated so that at input levels below 165V rms Q4 is off and the DC output voltage Vboost(x) is set to 245V dc by R18 and R24. If the mains exceeds 165V Q4 turns on and at 175V Q4 is completely saturated. When Q4 saturates at 175V RMS AC input voltage, Vrect(x), the DC output voltage, Vboost(x), is "capped" at a level of 360V DC. If, however, the peak mains input voltage Vrect(x) exceeds 360V then the boost converter 9 is bypassed by current flowing directly into an output capacitor (C2) via a boost diode D1 of the boost converter 9. In this case the PFC circuit ceases to function and the output capacitor C2 is charged during the mains voltage peaks in the same way as a conventional rectifier circuit. Since harmonic control legislation does not apply above 230V RMS AC the importance of this operating mode is of marginal importance. R22 is effectively connected in parallel with R24, recalibrating down the sample of the DC output voltage delivered to the voltage error amplifier (VSENSE pin 11). This increases the DC output voltage to 360V. Capacitor C14 filters out any mains ripple allowing for a smooth transition between the two DC output voltages.

The boost converter 9 is made up of inductor, L1, MOSFET Q1, diode D1 and C2 as shown in FIG. 4. The boost converter 9 and the associated PFC control IC are standard circuits used widely for PFC and harmonic control.

The advantage of not fixing the DC output voltage but adjusting the DC output voltage as a function of the rectified AC voltage input is that it offers higher efficiency, of the overall power supply, especially at low mains input voltage levels and at low loads, than can be achieved with a standard active PFC circuit with constant output voltage.

The active power factor pre-converter 3 embodying the present invention is connected to the main power supply converter 4 in two separate ways. Firstly, the DC voltage output on H2 provides the main input to the main power supply converter 4. Secondly, the active power factor pre-converter 3 has an input H4 which is adapted to receive synchronising pulses from the main power supply converter 4. The synchronising pulses drive the PFC control IC 6 in synchronisity with the main power supply converter.

In this regard, the synchronising pulses ensure that the transistor switch of the boost converter 9 is OFF during the period when the transistor switch of the main step-down converter 4 is ON. This anti-phase synchronisation ensures that the current pulse output by the boost converter 9 occurs during the same period as the current pulse drawn by the main converter 4. Anti-phase synchronisation ensures that the AC current that flows in the bulk capacitors C2 is reduced and enables a smaller cheaper bulk capacitor to be used.

In addition, the synchronising pulses provided on H4 pull the enable pin (OVP/EN) high as long as the synchronising pulses are received. In the absence of synchronising pulses on H4, the enable pin is pulled low which disables the PFC control IC 6. Thus, when the main power supply converter is turned off, when, for example, a personal computer is put in sleep mode, the synchronising pulses from the main power supply converter cease and the PFC control IC 6 powers down thereby saving power. Input H3 provides the power supply for the PFC control IC. It should be noted that an auxiliary converter can still take power from the mains voltage bypassing the PFC IC 6 even when the PPC circuit is off.

FIG. 6 shows a further embodiment of an active power factor pre-converter 3 utilising an external error amplifier. The non-inverting input of the voltage error amplifier receives a divided down sample output of the DC output voltage and this is compared with a sample of the rectified input mains voltage from pin 8, VFF at the inverting input of the voltage error amplifier. The error between these two samples is used directly to drive and vary the DC output voltage. The PFC control IC used in this example is the same as that used in the internal voltage error amplifier example. However, the internal voltage error amplifier is used solely as a gain stage.

Market demands require that power supplies for consumables such as personal computers and other appliances requiring a low DC voltage input should work anywhere in the world and should be able to cope with AC mains voltages varying from 90 to 265 volts—a so-called universal input. As can be appreciated from FIG. 5, if the input AC voltage supply is low, i.e. at 115 volts in the case of Japan, then the active power factor pre-converter embodying the present invention will drive the boost converter 9 to provide DC output voltage Vboost(x) which is only marginally greater than the rectified AC mains supply voltage as opposed to having to raise the DC output voltage to a high fixed DC output voltage of, for example, 385 volts, which would be the approach taken in a conventional active power factor pre-converter.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An active power factor pre-converter having a rectified AC voltage input from a mains AC power supply and a DC output voltage, the pre-converter comprising adjustment means to adjust automatically, in operation, the DC output voltage as a function of the rectified AC voltage input, wherein the active power factor pre-converter is connected to a main power supply converter and the main power supply converter produces synchronisation pulses which ensure that a transistor switch of the active power factor pre-converter is OFF during the period when a transistor switch of the main power supply converter is ON.

2. An active power factor pre-converter according to claim 1, wherein the means to adjust the DC output voltage includes means to sample the rectified AC voltage input and the DC output voltage.

3. An active power factor pre-converter according to claim 1, wherein the adjustment means adjusts the DC output voltage to a lower threshold value if the rectified AC voltage input falls below a predetermined value.

4. An active power factor pre-converter according to claim 1, wherein die adjustment means adjusts the DC output voltage to an upper threshold if the rectified AC voltage input rises above a predetermined value.

5. An active power factor pre-converter according to claim 1, wherein the adjustment means adjusts the DC output voltage to track the rectified AC voltage input.

6. An active power factor pre-converter according to claim 5, wherein the adjustment means adjusts the DC output voltage to a level a fixed amount greater than the rectified AC voltage input.

7. An active power factor pre-converter according to claim 6, wherein the fixed amount is between 0 and 15% of the amplitude of the rectified mains voltage.

8. An active power factor pre-converter according to claim 1, wherein the active power factor pre-converter is disabled when synchronisation pulses from the main power supply converter cease.

9. An active power factor pre-converter according to claim 8, wherein an auxiliary converter is still operable to take power from the mains AC power supply when the active power factor pre-converter is disabled.

10. A method of active power factor correction comprising:

connecting an active power factor pre-converter to a main supply converter; of automatically adjusting a DC output voltage of the active power factor pre-converter as a function of a rectified AC voltage input to the pre-converter; and producing synchronisation pulses in the main power supply converter which ensure that a transistor switch of the active power factor pre-converter is OFF during the period when a transistor switch of the main power supply converter is ON.

* * * * *